US006558809B1

(12) United States Patent
Kelch et al.

(10) Patent No.: US 6,558,809 B1
(45) Date of Patent: May 6, 2003

(54) FLEXIBLE, HALOGEN-FREE, RADIO-FREQUENCY SEALABLE FILMS

(75) Inventors: Robert H. Kelch, Midland, MI (US); Ing-Mari Gunnel Pettersson, Buhlertal (DE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/572,261

(22) Filed: May 17, 2000

Related U.S. Application Data

(60) Provisional application No. 60/134,717, filed on May 18, 1999.

(51) Int. Cl.⁷ .............................................. B32B 27/30
(52) U.S. Cl. ........................................ 428/520; 428/522
(58) Field of Search ................................ 428/520, 522, 428/500

(56) References Cited

U.S. PATENT DOCUMENTS

| | | | |
|---|---|---|---|
| 4,600,614 A | 7/1986 | Lancaster et al. | 428/35 |
| 4,601,948 A | 7/1986 | Lancaster et al. | 428/349 |
| 4,640,865 A | 2/1987 | Lancaster et al. | 428/421 |
| 4,660,354 A | 4/1987 | Lancaster et al. | 53/469 |
| 4,671,992 A | 6/1987 | Lancaster et al. | 428/316.6 |
| 4,678,713 A | 7/1987 | Lancaster et al. | 428/421 |
| 4,728,566 A | 3/1988 | Lancaster et al. | 428/286 |
| 4,766,035 A | 8/1988 | Lancaster et al. | 428/345 |
| 4,787,194 A | 11/1988 | Lancaster et al. | 53/469 |
| 4,847,155 A | 7/1989 | Lancaster et al. | 428/421 |
| 4,895,457 A | 1/1990 | Lancaster et al. | 383/94 |
| 5,627,223 A | 5/1997 | Dehannau et al. | 524/47 |

FOREIGN PATENT DOCUMENTS

| | | |
|---|---|---|
| EP | 193902 | 9/1986 |
| EP | 703271 A1 | 3/1996 |
| EP | 0 849 324 A | 6/1998 |
| JP | 11 099593 A | 9/1997 |
| WO | WO 85/01294 | 3/1985 |
| WO | WO 96/05056 | 2/1986 |
| WO | WO 86/07012 | 12/1986 |
| WO | WO 92/09415 | 6/1992 |

OTHER PUBLICATIONS

Patent Abstracts of Japan, vol. 1999, No. 09, Jul. 30, 1999, JP 11 099593A.
Encyclopedia of Polymer Science and Engineering, "Vinyl Alcohol Polymers" vol. 17, PP 186–187.*

* cited by examiner

Primary Examiner—D. Lawrence Tarazano

(57) ABSTRACT

Flexible, halogen-free films, both multilayer films and monolayer films, can replace polyvinyl chloride films in applications requiring high speed welding by high frequency radiation. The monolayer films result from a blend of a non-polar olefin polymer and a polar olefin polymer that contains carbon monoxide. The multilayer films have like that of the monolayer films, but located so as to promote high frequency sealing. Products made from such films are particularly well suited for medical device applications.

14 Claims, No Drawings

FLEXIBLE, HALOGEN-FREE, RADIO-FREQUENCY SEALABLE FILMS

This application is a continuation-in-part of Provisional application Ser. No. 60/134,717, filed May 18, 1999.

FIELD OF THE INVENTION

This invention concerns flexible films made from certain polymers that possess two important characteristics. First, they are substantially halogen-free. In other words, current analytical techniques do not reveal the presence of detectable quantities of chemically combined halogen. Second, the polymers yield films that can be activated (bonded or sealed) with high frequency (HF) electromagnetic energy. More particularly, this invention concerns HF or radio frequency (RF) weldable films containing carbon monoxide (CO) copolymers or interpolymers.

BACKGROUND OF THE INVENTION

Products manufactured from flexible polyvinyl chloride (f-PVC) have been used for many years in a multitude of applications. In recent years, however, growing concern about the environmental impact of halogen-containing polymers, from manufacture through disposition, has led to a desire to find alternatives for halopolymers, especially for PVC. Additionally, f-PVC contains a large percentage (typically from 10 to 40 percent (%)) of phthalate plasticizer. Such plasticizers have recently come under scrutiny because of medical and health concerns associated with migration of plasticizer from products that come into intimate contact with the human body, e.g., medical products, food products or toys, or because of leaching to the environment.

Flexible PVC film and sheet is used in many packaging, containment, decorative and protective applications that rely on the physical strength, flexibility, gas impermeability, low cost and HF sealability characteristics of the polymer. With the growing interest in replacing PVC with halogen-free polymers, much attention has been focused on polyolefin polymers such as polypropylene (PP), polyethylene (PE), metallocene polyethylene (mPE), styrenic-olefinic block copolymers and ethylene copolymers like ethylene-vinyl acetate (EVA). Although these polymers duplicate many f-PVC properties, none of them exhibit adequate dielectric properties to permit efficient HF sealability. While films or sheets made from these substitutes for PVC can be thermally welded or heat-sealed, they are not appropriate for HF activation in general or for RF sealing in particular.

Various halogen-free polymers have been described in the literature as exhibiting dielectric properties that permit HF or RF welding or sealing, e.g., thermoplastic polyurethane (TPU), polyamide (nylon) and glycol modified polyester (PETG). However, these polymers cost more than PVC, making direct substitution for f-PVC economically unattractive. In addition, some of the alternate RF active polymers have a significantly higher tensile modulus or stiffness than f-PVC, making the substitution in flexible film packaging or bag applications unfeasible.

Another approach to replace f-PVC with halogen-free polymers, uses copolymers of olefins with acrylate esters or vinyl acetate (VA). By copolymerizing higher levels (generally greater than (>) 15 percent by weight (wt %), based on copolymer weight) of VA or methyl acrylate with ethylene, some measure of RF activity can be achieved. While such olefin copolymers exhibit tensile and modulus properties similar to those of f-PVC and cost less than TPU, nylon and PETG, they have a dielectric loss factor (DLF) that is significantly lower than that of f-PVC. Consequently in RF sealing or welding operations, films made from copolymers of olefins with alkyl acrylates or VA require larger RF generators with a concomitant increase in both capital expenses and power usage, and longer welding times resulting in higher final part costs.

Another approach to incorporating RF activity into a halogen-free polymer is by blending in a RF active inorganic or organic particulate additive, typically at high loading levels. EP 193,902 discloses RF energy sensitized compositions in which inorganic sensitizers such as zinc oxide, bentonite clay, and alkaline earth metal aluminosilicates can be added at 1 to 20 wt % to a composition. WO 92/09415 describes incorporating RF receptors such as phosphonate compounds, phosphate compounds, quaternary ammonium salts, polystyrene sulfonate sodium salt, alkaline earth metal sulfate, and aluminum trihydrate into thermoset compounds and films. U.S. Pat. No. 5,627,223 discloses adding 1 to 50 wt % starch (to impart RF weldability) to a polyolefin blend that also contains a coupling agent. However, incorporation of inorganic or organic particulates will adversely affect film optics and clarity, tensile strength and toughness properties.

Several references teach that CO-containing ethylene copolymers exhibit excellent dielectric properties making them suitable for RF welding. For example, a series of USPs (U.S. Pat. Nos. 4,600,614; 4,601,865; 4,601,948; 4,660,354; 4,671,992; 4,678,713; 4,728,566; 4,766,035; 4,787,194; 4,847,155; and 4,895,457) teaches the use of CO-containing ethylene copolymers, e.g., ethylene-CO (ECO), ethylene-acrylic acid-CO (EAACO) and ethylene-vinyl acetate-CO (EVACO) for applications involving RF weldability and microwave heatability. With high levels of CO, CO-containing copolymers have excellent RF sealability and processability, but the polar nature of the copolymer results in lower interlayer cohesion with adjacent non-polar polyolefin layers in multilayer films. Conversely, with lower levels of CO, the RF activity is not sufficient to allow high speed RF sealing operations. U.S. Pat. No. 4,678,713, along with WO 86/07012, disclose coextruded multi-ply laminates in which at least one ply comprises a CO-containing polymer with RF sealability. Such laminates find use in the construction of multi-wall bags or containers. However, these disclosures are primarily concerned with coextruded multi-ply laminates in which at least one ply is a halopolymer.

WO 96/05056 teaches a thermoplastic polymer blend of a non-polar polyolefin (PO) and a polar ethylene copolymer having CO functionality. The blend contains from 1–90 wt % polar copolymer, based on blend weight. The blend forms a peelable seal layer for an easy opening package rather than a permanent seal. In general, seal strength decreases with increasing polar copolymer content.

EP 0703271 A1 discloses blends of EVA, very low density polyethylene (VLDPE) and, optionally, an EVACO terpolymer that are useful in providing flexible non-halogen containing thermoplastic polyolefin compositions for roof liners.

U.S. Pat. No. 5,029,059 discloses multilayer oriented, heat shrinkable thermoplastic films which may contain ECO copolymers. Halopolymers are recommended as preferred components and RF weldability is not mentioned.

SUMMARY OF THE INVENTION

In a first aspect, the present invention is a multilayer film comprising at least (a) a polar layer having a dielectric loss factor of at least ($\geq$) 0.10 comprising an ethylene copolymer with carbon monoxide (CO) wherein the CO comprises at least 3 percent by weight of the polar layer and (b) a layer comprising a non-polar olefin homopolymer or a non-polar olefin copolymer. The films of the present invention are free of halogen containing polymer and exhibit HF or RF sealability in high speed manufacturing operations.

In a second aspect, the present invention is a halogen-free, HF sealable film comprising a blend of at least two olefin polymers, wherein one olefin polymer is a non-polar homopolymer or a non-polar copolymer and at least one olefin polymer has polymerized therein at least ethylene and CO, the CO being present in an amount sufficient to give the blend a DLF of at least 0.10. The amount of CO is desirably $\geq 3$ wt %, based on total blend weight. The film is preferably a monolayer film, more preferably a substantially phthalate plasticizer-free film. The film of this aspect can, however, function as the polar layer of the multilayer film of the first aspect.

A third aspect of the present invention is an article of manufacture fabricated from the film of either the first aspect or the second aspect. The article of manufacture desirably includes at least one segment wherein the film is sealed to itself, a substrate or both at a seal interface. Sealing preferably results from exposure of the film to HF or RF energy. The seal interface preferably has a bond strength of at least one pound per inch (lb/in) (0.18 Newton per millimeter (N/mm)).

Such films, which can replace f-PVC without the use of plasticizers and which are RF sealable, are particularly suitable for applications in which the film, or the products in contact with the film, come into intimate contact with the human body. Such applications may include medical or urological collection bags, medical ostomy bags, medical infusion or intravenous (IV) bags, inflatable devices such as air mattresses, flotation devices or toys, food packaging, retail product blister packaging, children's articles and toys, reinforced laminates for tents and tarpaulins, roofing membranes and geotextiles, and stationery applications such as notebook binder covers. Compositions that yield the films of the present invention can also be extruded into a tubing with an RF active outer layer. Such tubing can readily be used in conjunction with RF weldable films to provide a complete RF welded PO film structure such as a medical collection bag. Skilled artisans can easily expand this illustrative listing to include virtually any device or application that requires an HF or RF sealable, flexible, mono-layer or multilayer film structure. The relatively low (compared to f-PVC) cost of PO materials used to make the films of the present invention and the performance features of such films opens many opportunities for replacement of flexible, plasticized, halogenated films such as f-PVC.

DETAILED DESCRIPTION OF THE INVENTION

Unless otherwise stated, a range includes both endpoints used to state the range.

"Halogen-free", as applied to films of the present invention, refers to polymer materials used to form the films. The polymer materials lack chemically combined halogen atoms. In other words, halogenated monomers do not constitute building blocks for the polymer materials. In addition, the polymers are not halogenated subsequent to formation as in the case of chlorinated polyethylene prepared via a slurry chlorinating process. The films may, however, contain small amounts of non-polymeric halogenated additives, including conventional halogenated fire retardant additives.

DLF is a calculated value determined by multiplying a material's dielectric constant (DC) by its dielectric dissipation factor (DDF) (or loss tangent). The DC and DDF are readily determined by instrumented dielectric testing methods. An especially preferred test fixture uses a Hewlett-Packard Impedance/Material Analyzer, Model 4291B coupled with a Hewlett-Packard Dielectric Test Fixture, Model 16453A. Dielectric properties can be measured on compression molded plaques (diameter of 2.5 inches (in) (64 millimeter (mm)) and a thickness of 0.050 in (1.3 mm) formed from a material such as a polymer or a blended polymer compound.

"HF sealability" refers to the bonding of a sealable polymer to a portion of itself or to another material using electromagnetic energy frequencies of 0.1–30,000 megahertz (MHz). This includes RF heating and microwave (MW) heating rather than conventional heat sealing. The HF range generically covers three frequency ranges more commonly referred to as an ultrasonic frequency range (18 kilohertz (KHz)–1000 KHz), the RF range (1 MHz–300 MHz), and the MW frequency range (300 MHz–10,000 MHz). The RF and MW ranges are of particular interest. The terms "activating", "sealing", "bonding", and "welding" (and variations of each word) are used interchangeably herein.

In general, skilled artisans regard a material with a DLF of less than (<)0.05 as RF or HF inactive. They classify materials with a DLF within a range of 0.05–0.1 as weakly RF or HF active. They consider materials with a DLF >0.1 to have good RF or HF activity, and materials with a DLF >0.2 to be very RF or HF active, and thus exhibits excellent RF sealability. While a DLF of 0.1 may produce satisfactory results, skilled artisans typically prefer a DLF >0.1, more often >0.15 and still more often>0.2, in order to obtain sufficient sealing by application of HF waves in general and RF waves in particular.

An "olefin polymer having polymerized therein at least ethylene and CO" and an "ethylene copolymer with CO". both generically refer to polymers prepared by polymerizing CO with ethylene and, optionally, one or more monomers that have ethylenic (olefinic) unsaturation using a conventional catalyst (such as a Ziegler-Natta catalyst), a metallocene catalyst (including constrained geometry catalysts), or both. The latter monomers include those containing 3 to 20 carbon atoms ($C_{3-20}$), especially $C_{3-8}$ alpha-olefin (α-olefin) monomers. The polymers may also include one or more of $C_{3-8}$ unsaturated organic acids, such as acrylic acid, methacrylic acid and 1-butenoic acid, alkyl esters or metal salts of these acids, such as ethyl acrylate, methyl methacrylate, n-butyl acrylate, sodium acrylate and potassium methacrylate, and vinyl acetate. The polymers must contain an amount of CO sufficient to render the polymer susceptible to heating by HF radiation in general and RF radiation in particular. This amount should provide a DLF $\geq 0.1$, preferably $\geq 0.15$. The amount of CO desirably exceeds 3 wt %, based on total polymer weight. The amount preferably lies within a range of from 4 wt % to <50 wt %, based on total polymer weight, more preferably within a range of from 6 to 40 wt %, still more preferably within a range of from 8 to 30 wt %.

Preferred olefin polymers having polymerized therein both ethylene and CO include ECO copolymers, EVACO terpolymers, EAACO terpolymers and ethylene-n-butyl acrylate-CO (EnBACO). Many skilled artisans interchangeably use "copolymer" and "interpolymer" to refer to polymers having polymerized therein at least two monomers. While adopting that convention, the above illustrations use copolymers to refer to the presence of two polymerized monomers and terpolymers to refer to the presence of three polymerized monomers. In that context, four polymerized monomers could be called a tetrapolymer, but is more often referred to as an interpolymer.

While the polar layer of the multilayer film of the first aspect may entirely comprise an ethylene copolymer with CO, the polar layer preferably comprises a blend of an ethylene copolymer with CO with a non-polar olefin homopolymer, a non-polar olefin copolymer or both. The non-polar polymers lack a detectable CO content (based on current analytical technology) and are sometimes referred to herein as "CO-free". As such, the polar layer, when it contains a non-polar homopolymer, a non-polar copolymer or both, preferably has a composition equivalent, if not identical, to that used to make the films of the second aspect of the present invention. The only requirement is that the overall CO content of the polymer blend be $\geq 3$ wt %, based on weight of the polymer blend. Preferably, the ethylene copolymer with CO comprises from about 30 to about 80 wt % of the polymer blend.

Suitable non-polar polymers include any thermoplastic olefin polymer other than an "ethylene copolymer with CO" as defined herein. The non-polar olefin polymer may be a homopolymer, such as PE or PP, or a copolymer such as ethylene-butene-1 (EB), ethylene-octene-1 (EO) or ethylene-propylene (EP). Useful non-polar olefin polymers include low density polyethylene (LDPE), linear low density polyethylene (LLDPE), ultra low density polyethylene (ULDPE), high density polyethylene (HDPE), polyethylene plastomer (metallocene catalyst, 0.86–0.92 grams per cubic centimeter (g/cc) density (mPE)), polypropylene homopolymer (PP), polypropylene copolymer (co-PP), EVA, ethylene-methyl acrylate (EMA), ethylene-n-butyl acrylate (EnBA), ethylene-ethyl acrylate (EEA), ethylene-acrylic acid (EAA), ethylene-methacrylic acid (EMAA), ionomerized metal salts of carboxylic acid copolymers, such as sodium, potassium or zinc ionomers of EAA or EMAA, ethylene-propylene-diene terpolymer, (EPDM), ethylene-styrene interpolymer (ESI), ethylene-vinyl alcohol (EVOH), polybutene (PB), polyisobutene (PIB), styrene-butadiene (SB) block copolymer, styrene-isoprene-styrene (SIS) block copolymer, styrene-ethylene-butene-styrene (SEBS) block copolymer or maleic anhydride (MAH) grafted (g) POs such as EVA-g-MAH, PE-g-MAH and PP-g-MAH. Preferred non-polar olefin polymers include at least one of LDPE, LLDPE, mPE, PP, co-PP, ESI, EAA, EVA, EMA, and MAH-g-POs. The polymer blends typically contain from 20 to 70 wt % non-polar olefin polymer(s), based on blend weight, but greater or lesser amounts may be used if the blend has an overall CO content of $\geq 3$ wt %.

The films of the present invention may, and preferably do, further comprise a compatibilizer, typically an additional olefin polymer. Suitable compatibilizers include ethylene copolymers having polymerized therein, or grafted thereto, one or more polar comonomers. The compatibilizers promote at least macroscopic or visual blend uniformity between a polar CO-containing polymer and a non-polar olefin polymer. Illustrative compatibilizers include EVA, EnBA, EMA, EEA, EAA, olefins grafted with dicarboxylic acid or anhydride, styrenic block copolymers and ESI. These compatibilizers can be utilized in the polymer blend used to make the films of the second aspect or in layer (a), layer (b), or both layers (a) and (b) of the multilayer films of the first aspect of the invention.

The polymer blends that form the films of the present invention may also include one or more conventional additives that impart a functional attribute to the films, but do not significantly detract from film sealability via exposure to HF or RF irradiation. Such additives include, without limitation, antioxidants or process stabilizers, ultraviolet (UV) stabilizers, tackifiers, fire retardants, inorganic fillers, biocides, and pigments.

The films described herein may be of any gauge that serves a given need, but typically have an overall gauge within a range of from 0.5 to 100 mils (12 to 2500 micrometers ($\mu$m)), preferably from 1 to 40 mils (25 to 1000 $\mu$m) and most preferably from 2 to 20 mils (50 to 500 $\mu$m).

Any conventional film forming process may be used to fabricate films of the present invention. Illustrative processes suitable for use in making films of the second aspect include, without limitation, an annular extruded blown film process, a slot die cast extrusion film process, and extrusion coating of one or more layers upon a film or substrate. The multilayer films of the first aspect of the present invention have $\geq$ two layers, with $\geq$ one CO-containing polar layer and $\geq$ one adjacent layer comprising an olefin homopolymer or copolymer. Such multilayer films can be produced by a conventional annular coextruded blown film process, a slot die cast coextrusion film process, extrusion coating of multiple layers upon a film or substrate, or lamination of multiple plies of film layers. Additionally, the polymer compositions disclosed can be dissolved in solvent or dispersed as an aqueous dispersion or emulsion and coated from a liquid phase using conventional liquid coating processes. In addition, the films of the present invention can be fabricated into extruded profile shapes such as tubing. For example, a RF-weldable monolayer or coextruded, multilayer, tubular structure may be bonded to a film or other substrate to fabricate a composite part such as a medical collection bag. The polymer blend compositions described herein can also be dissolved in solvent or dispersed as an aqueous dispersion or emulsion and coated from a liquid phase using conventional liquid coating processes.

In order to achieve RF weldability of a multilayer film of the first aspect of the present invention to itself or to another substrate, the CO-containing RF active layer must either be the surface bonding or adhesive layer or it must be in close proximity to the surface bonding or adhesive layer such that the heat generated by the RF activation of the CO-containing layer can quickly transmit to and through the surface bonding or adhesive layer, melting this layer and causing thermal bonding and sealing.

For multilayer films in which the CO-containing RF active layer is a surface bonding or adhesive sealing layer, the layer is desirably $\geq 10$% of the overall film gauge, and preferably $\geq 20$% of the overall film gauge for films <10 mils (250 $\mu$m) in thickness. For films thicker than 10 mils in which the CO-containing RF active layer is a surface bonding or adhesive sealing layer, the minimum layer thickness must be $\geq 1.0$ mil (25 $\mu$m).

For multilayer films in which the CO-containing RF active layer is not a surface bonding or adhesive sealing layer, and is covered by an adjacent adhesive sealing layer, the layer thickness of the sealing layer should be kept to a minimum so as not to inhibit heat transfer and polymer melting of this seal layer after the adjacent RF active layer is activated and heated by the imposed RF field. For multilayer films thinner than 10 mils (250 $\mu$m), the CO-containing RF active layer should be $\geq 20$% of the overall film gauge, and preferably $\geq 30$% of the overall film gauge so as to provide sufficient heat generation to melt the adjacent adhesive sealing layer and cause bonding to occur.

Any of the films described herein can be sealed or welded to itself or to another substrate using a conventional HF sealer, such as a RF sealer. Commercially available RF welders, such as those available from Callanan Company, Weldan, Colpitt, Kiefel Technologies, Thermatron, Radyne and others, typically operate at a frequency of 27.12 MHz. Two less frequently used RFs are 13.56 MHz and 40.68 MHz. Typical MW sealing or welding apparatus function at frequencies of 2450 MHz (2.45 GHz), 5800 MHz (5.8 GHz) and 24.12 GHz.

RF or MW activation (sealing and bonding) offers a performance advantage over conventional thermal or heat sealing when rapid sealing time becomes a dominant factor, such as in high speed manufacturing. HF (including RF and MW) bonding technologies allow energy to be concentrated at the HF active layer, thus eliminating the need to transfer heat through an entire structure. This is particularly advantageous with thick films (gauge >5 mils (125 $\mu$m)) where conventional thermal sealing would require relatively long contact times to permit thermal transfer through the thick polymer structure to the bonding interface. RF seal times as short as 0.4 second can be used wherein conventional thermal contact or impulse sealing might require a several seconds (or longer) seal time with thicker films. HF bonding is also advantageous when a thermally sensitive material is used within the composite, such as a color sensitive dyed fabric or nonwoven or an oriented film which can soften and undesirably shrink upon heating. RF dies can also be fabricated in very complex shapes, which is difficult to do with thermal sealing equipment.

The films of the present invention facilitate fabrication of a variety of structures via HF sealing. For example, a film can be folded over and at least partially HF sealed to itself to form a bag or a pouch. Two plies of the same film readily form a bag or pouch without a fold. HF sealing also promotes bonding of such a film to a substrate such as another film, nonwoven fabric, injection molded or extruded parts, or paper. For most applications, sufficient HF sealing or bonding equates to an adhesive strength of $\geq 1.0$ pound per inch (lb/in) (0.18 Newton per millimeter (N/mm)). In the case of RF welding of medical collection bags or drainage pouches, the RF weld between the two plies of film must be strong enough that the films cannot be peeled apart without tearing the film or exceeding the strength of the film itself. This requires seal strengths of $\geq 4.0$ lb/in (0.70 N/mm), as tested by the 180 degree peel test of ASTM D-903. Thicker film structures, such as those used for inflatable applications, generally require even greater weld or bond strengths. The film adhesive or seal layer must be formulated in conjunction with the CO-containing RF active layer so as to achieve a permanent bond rather than an unacceptable peelable seal. Films like those of the present invention, but with a total CO content <3 wt %, typically yield peelable seals that fail the above adhesive strength requirements when exposed to the same level of HF radiation. Similarly, interlayer adhesion between the coextruded layers of the film must be high enough that the layers intimately bond together and do not peel apart at less than desired seal strengths. As such, compositions of the various layers must be formulated so that the layers will cohesively bond together.

Notwithstanding emphasis upon HF weldability, films of the present composition can also be thermally laminated, sealed or welded using conventional thermal processes such as hot roll lamination, flame lamination, and heat sealing. With this capability, one can combine a thermal process with HF welding. One illustration of such a combination involves a first step of thermally laminating a film of the present invention to a substrate such as a fabric thereby forming a film/fabric composite and a second, sequential step of HF welding two composites together at a film/film interface, thereby providing film interior surfaces and fabric exterior surfaces.

The following examples illustrate, but do not limit, the present invention. Unless specifically indicated otherwise, all parts and percentages are based on weight.

EX 1

Dielectric properties of a polymer or a compounded blend of polymers are determined using a Hewlett-Packard Impedance/Material Analyzer, model 4291B coupled with a Hewlett-Packard Dielectric Test Fixture, model 16453A and compression molded polymer test plaques 2.5 in (64 mm) in diameter and 0.050 in (1.3 mm) in thickness. The product of the DC and the DDF, both of which can be measured, is the DLF or loss index. Table 1 presents DLF data obtained at a frequency of 27 MHz for the indicated polymers and polymer blends.

TABLE 1

|  | DLF |
| --- | --- |
| LDPE | <0.001 |
| ECO (1% CO) | 0.010 |
| EAA (9.7% AA) | 0.003 |
| EAA (20% AA) | 0.007 |
| EVA (18% VA) | 0.076 |
| EVA (25% VA) | 0.108 |
| EVA (28% VA) | 0.149 |
| EVACO (20% VA, 8% CO) | 0.413 |
| 80% EVACO - 20% EVA (6.4% CO total) | 0.346 |
| 60% EVACO - 40% EVA (4.8% CO total) | 0.276 |
| EVA (0% CO) | 0.108 |
| EnBACO (30% nBA, 10% CO) | 0.672 |
| ESI (70% ethylene, 30% styrene) | 0.003 |
| 75% ESI - 25% EVACO (2.0% CO total) | 0.066 |
| 75% ESI - 25% EnBACO (2.5% CO total) | 0.078 |
| LLDPE | <0.001 |
| 75% LLDPE - 25% EVACO (2.0% CO total) | 0.057 |
| 60% LLDPE - 40% EVACO (3.2% CO total) | 0.096 |
| EAA (9% AA) | 0.003 |
| 60% EAA - 40% EVACO (3.2% CO total) | 0.093 |
| EVOH (38% ethylene) | 0.264 |
| 50% EVOH - 50% EnBACO | 0.450 |
| 50% EVOH - 50% EVACO | 0.404 |

EX 2

Prepare a 3-layer coextruded film on a conventional upward blown film line. The 4.0 mil (100 $\mu$m) film structure consists of an outermost seal layer comprising 10% of the film gauge (0.4 mil or 10 $\mu$m), an adjacent RF active core layer comprising 40% of the film gauge (1.6 mil or 40 $\mu$m), and an adjacent innermost main layer comprising 50% of the film gauge (2.0 mil or 50 $\mu$m). The seal layer comprises 90% ELVAX® 3174 EVA (18% VA, 8.0 grams per 10 minutes (g/10 min) melt index (MI)) and 5% of an LDPE-based antiblock concentrate (20% $SiO_2$ in LDPE, CN-744, Southwest Chemicals) and 5% of an EVA-based slip/antiblock concentrate (20% $SiO_2$, 2.5% sterylamide, and 2.5% erucylamide in EVA, CN-4420, Southwest Chemicals). The RF active core layer comprises 80% ELVALOY® 4924 EVACO (20% VA, 10% CO, 8.0 g/10 min MI) and 20% ELVAX® 3190 EVA (25% VA, 2.0 g/10 min MI). The RF active core layer has a DLF of 0.35 and a total CO content of 6.4%. The main outermost layer comprises a blend of 80% DOWLEX* 2045A LLDPE (0.925 g/cc density ($\rho$), 1.5 g/10 min MI) and 10% LDPE 681I (0.922 g/cc, 1.2 g/10 min MI, The Dow Chemical Company) and 5% each of the antiblock concentrates used in the seal layer.

\* means trademark of The Dow Chemical Company. ELVAX and ELVALOY are trademarks of E. I. du Pont de Nemours and Company.

The film extrudes at a melt temperature of 380–400° F. (193–204° C.). A 1.5 KW Callanan RF sealer operating at 27.1 MHz and 0.5 second seal time to seals two plies of the film together with the seal side to seal side of both plies. An Instron tensile tester is used to peel apart a 1 in (25 mm) strip of the 2-ply laminate in accordance with American Society for Testing and Material (ASTM) Test D-903. It shows that the laminate has a seal strength of 4.5 lb/in (0.79 N/mm). When two plies of film are welded into a 1.5 liter medical urological drainage bag on a commercial 4 KW RF press using a 0.5 second RF seal time, the bag exhibits an air inflation burst pressure >80 pounds per square inch gauge (psig) 552 kilopascals (kPa) and exhibits no air leakage when the air inflated bag is submerged under water. Additionally, the 1.5 liter bag, when filled with 750 milliliters (ml) of water, survives a 3 foot (ft) (1 meter) drop onto a concrete floor without bursting.

EX 3

Make a 3-layer, 4.0 mil (100 μm) coextruded film using a conventional slot die cast film process. The film comprises a RF active seal layer (25% of the film gauge (1.0 mil, 25 μm)), an adjacent polyolefin core layer (50% of the film gauge (2.0 mil, 50 μm)), and an adjacent outermost skin layer (25% of the film gauge (1.0 mil, 25 μm)). The RF active seal layer comprises 72% of the EVACO used in Example 2, 20% ELVAX® 3175 EVA (28% VA, 6.0 g/10 min MI), 5% of a LDPE-based antiblock concentrate (20% $SiO_2$ in LDPE) and 3% of the EVA-based slip/antiblock concentrate used in Ex 2. The adjacent polyolefin core layer comprises 80% DOWLEX* 2035 LLDPE (0.919, 6.0 g/10 min MI) and 20% of the EVA used in the seal layer. The outermost skin layer comprises a blend of 80% of the LLDPE used in the core layer and 10% LDPE 501I (0.922 g/cc, 1.9 g/10 min MI, The Dow Chemical Company), and 5% each of the LDPE-based antiblock concentrate and the EVA-based slip/antiblock concentrate used in the seal layer.

Extrude the film at a melt temperature of 380° F. (193° C.) onto cast rolls at 75° F. (24° C.) and wind it into a film. Seal two plies of the film together as in Ex 2. Instron tensile testing as in Ex 2 shows a seal strength of 4.0 lb/in (0.80 N/mm).

EX 4

Extrude a series of 8.0 mil (200 μm) monolayer films that have varying levels of RF activity through a conventional blown film line at 350° F. (177° C.). Blends of the same EVACO as in Example 3 and mPE (AFFINITY* PF1140, 0.896 g/cc, 1.6 g/10 min MI) as shown in Table 2. Seal two plies of the film together as in Ex 2, but with a 50% power setting on the sealer. Subject the films to Instron tensile testing as in Ex 3. Summarize test results in Table 2 and designate failure mode with an "A" if the film peels apart (Adhesive failure) and a "B" if the film fails by breaking at the seal (Break).

TABLE 2

| Film ID | Composition Wt % mPE | Wt % EVACO | Seal Strength Lb/in | N/mm | Failure Mode | DLF |
|---|---|---|---|---|---|---|
| 4-1* | 100 | 0 | None | None | A | 0.001 |
| 4-2* | 75 | 25 | None | None | A | 0.06 |
| 4-3 | 60 | 40 | 0.6 | 0.10 | A | 0.10 |
| 4-4 | 40 | 60 | 2.2 | 0.38 | B | 0.16 |
| 4-5 | 25 | 75 | 3.8 | 0.66 | B | ** |

*Comparative Example
**not measured

Films that contain >40% EVACO (>3.2% CO in the blend) exhibit excellent adhesion.

EX 5

Prepare a series of 5.0 mil (125 μm) coextruded 3-layer films using blends of the EVACO used in Ex 4 and EVOH (SORANOL® E-3808, 38% ethylene, 8 g/10 min melt flow rate (MFR), 1.17 g/cc density (ρ), Nippon Gohsei) as the RF active layer. Make the 3-layer "ABC" structured films on a blown film line with three separate 1 in (2.5 cm) diameter Killion extruders and a 1.5 in (3.6 cm) diameter Killion 3-layer blown film die and extrude the films at a temperature of 350° F. (177° C.). Each film has 10% of film gauge as an adhesive seal layer (0.5 mil (13 μm) thickness) comprised of either PRIMACOR* 1430 EAA (9.7% AA, 5.0 g/10 min MI) designated as "A/S-1" or BYNEL® CXA 3861 MAH-g-EVA (2.0 g/10 min MI, 0.95 g/cc) designated "A/S-2". The RF active core layer comprises 50% (2.5 mils (62 μm)) of the film thickness, with the composition of the layer as specified in Table 3 below. An outer layer that is 40% (2.0 mil (50 μm)) of the film thickness comprises PRIMACOR* 1410 EAA (9.7% AA, 1.5 g/10 min MI, 0.94 g/cc). Seal two plies of each film together as in Example 3, but with adhesive layers facing each other and at 60% power. Summarize results in Table 3.

*Trademark of The Dow Chemical Company, BYNEL is a trademark of E. I. du Pont de Nemours and Company.

TABLE 3

| Film ID | Adhesive/Seal Layer | RF Active Layer | Adhesion (lb/in) | (N/mm) |
|---|---|---|---|---|
| 5-1 | A/S-1 | 50% EVACO 50% EVOH | 3.4 | 0.60 |
| 5-2 | A/S-1 | 100% EVACO | 2.9 | 0.51 |
| 5-3 | A/S-2 | 80% EVACO 20% EVOH | 4.7 | 0.82 |
| 5-4 | A/S-2 | 50% EVACO 50% EVOH | 2.0 | 0.35 |

Films 5-1 and 5-4 both contain a RF active core layer that has a DLF value of 0.40 and 4% CO. Film 5-2 has a RF active core layer with a DLF value of 0.45 and 8% CO. Film 5-3 has a RF active core layer with a DLF value of 0.38 and 6.4% CO.

EX 6

Coextrude a series of 4.0 mil (100 μm) 3-layer blown films using conditions described in Ex 5. The outer adhesive seal layer (15% of the film gauge (0.6 mil (15 μm))) has the same composition as the seal layer of Ex 2. The core RF active layer comprises a blend of the EVACO and EVA used in Ex 2, in ratios as specified in Table 4 (35% of the film gauge (1.4 mil (35 μm))). The main inner layer (50% of the film gauge (2.0 mil (50 μm))) comprises a blend of 75% of the LLDPE used in Ex 2 and 20% of the LDPE in Ex 3 with 5% of the EVA-based slip/antiblock concentrate used in Ex 2.

Seal two plies of the film together with the adhesive layer to adhesive layer as in Ex 4. Subject the sealed plies to Instron tensile testing. Designate failure mode with an "IL" if the film peels apart with an interlayer failure, meaning separation between layers within the film, and a "B" if the film fails by breaking at the seal or in the film itself. The "IL" designation means that the film seal exceeds the cohesive strength of the film itself. A "B" designation means that the seal strength exceeds the tensile strength of the film. In either case, the actual adhesive seal strength is >the value indicated.

TABLE 4

| Film | RF Core Layer | Failure Mode | Adhesion (lb/in) | (N/mm) |
|---|---|---|---|---|
| 6-1* | 100% EVACO | IL | 3.5 | 0.61 |
| 6-2 | 80% EVACO 20% EVA | B | 5.7 | 1.00 |
| 6-3 | 60% EVACO 40% EVA | B | 6.3 | 1.10 |

*Comparative Example

Film 6-1 exhibits good bond formation, but the polar nature of the EVACO results in poor interlayer bonding to the adjacent non-polar polyethylene main layer. Films 6-2 and 6-3 include an EVA resin in the core layer that enhances interlayer cohesive strength, resulting in much higher overall adhesion strength.

Test the three films for water vapor transmission rate (WVTR) using a Mocon Permatran W600 according to ASTM F-1249 and for oxygen transmission rate ($O_2$TR) in terms of cubic centimeters per 100 square inches of film per 24 hour period per atmosphere at pressure (cc/100 in$^2$-day-atm) or cubic centimeters per square centimeters of film per second per centimeter of mercury (cc/cm$^2$-sec-cm Hg) using a Mocon Oxtran 1050 according to ASTM D-3985. Summarize the WVTR and $O_2$TR data in Table 5.

TABLE 5

| Film | WVTR* | $O_2$TR** |
|---|---|---|
| 6-1 | 0.62 | 125/29.5 × 10$^{-9}$ |
| 6-2 | 0.71 | 116/27.3 × 10$^{-9}$ |
| 6-3 | 0.68 | 138/32.6 × 10$^{-9}$ |

*WVTR = g/100 in$^2$/day
**$O_2$TR = (cc/100 in$^2$-day-atmosphere)/(cc/cm$^2$-sec-cm Hg)

EX 7

Prepare a series of 6.0 mil (150 μm) coextruded 2-layer and 3-layer cast films on a cast film line with three separate 1 in (2.5 cm) diameter Killion extruders attached to a 3-layer feedblock and 10 in (25 cm) wide cast film die. Use extrusion temperatures of 350° F. (177° C.)–400° F. (204° C.). For the 2-layer coextruded films, the RF active adhesive/seal layer comprises a blend of 75% ELVALOY® HP441 EnBACO (10% CO, 30% n-butyl acrylate, 9 g/10 min MI, 0.98 g/cc) and 20% ELVAX® 3190 EVA and 5% CN4420 slip/antiblock concentrate (20% SiO2, 2.5% strearamide, 2.5% erucyamide in an EVA carrier, Southwest Chemicals) and is 30% of the film gauge (1.8 mil (45 μm)). The main inner layer, which is 70% of the film gauge (4.2 mil (105 μm)), comprises blends of various polyolefins as shown in Table 6.

For the 3-layer coextruded films, the adhesive seal layer (10% of the film gauge (0.6 mil (15 μm)) has the same composition as the seal layer of Ex 2. A core RF active layer comprises a blend of 75% EnBACO and 25% EVA, both the same as used in the 2-layer films (40% of the film gauge (2.4 mil (60 μm)). The main inner layer (50% of the film gauge (3.0 mil (75 μm)) is a blend of various polyolefins as shown in Table 7. Seal two plies of the film together with the (adhesive layer to adhesive layer) as in Ex 4, but increase the seal time to 1 second. Conduct Instron tensile testing as in Ex 6.

The main layers of films 7-2-1 and 7-3-1 use ESI-1 (INDEX* DS 200, 73% styrene, 27% ethylene, 1 g/10 min MI). The main layers of films 7-2-2 and 7-3-2 use ESI-2 (INDEX* DE 200, 30% styrene, 70% ethylene, 1 g/10 min MI). INDEX is a trademark of The Dow Chemical Company.

TABLE 6

2-Layer Film

| Films | Main Layer | Adhesion (lb/in)/(N/mm) | Failure Mode |
|---|---|---|---|
| 14-2-1 | 95% ESI-1 5% CN-4420 | 5.5/0.96 | IL |
| 14-2-2 | 95% ESI-2 5% CN-4420 | 2.9/0.51 | B |
| 14-2-3 | 97% REXFLEX W210 3% CN-4420 | 2.5/0.44 | IL |
| 14-2-4 | 80% AFFINITY PF1140 15% ELVAX 3175 5% CN4420 | 3.7/0.65 | B |

TABLE 7

3-Layer Film

| Films | Main Layer | Adhesion (lb/in)/(N/mm) | Failure Mode |
|---|---|---|---|
| 14-3-1 | 95% ESI-1 5% CN4420 | 7.5/1.31 | IL |
| 14-3-2 | 95% ESI-2 5% CN-4420 | 4.1/0.72 | B |
| 14-3-3 | 97% REXFLEX W210 3% CN-4420 | 3.1/0.54 | IL |
| 14-3-4 | 80% AFFINITY PF1140 15% ELVAX 3175 5% CN4420 | 4.6/0.80 | B |

The data in Tables 6 and 7 show that multilayer films of the present invention, whether in the form of a two-layer film with a RF-active seal layer or a three-layer film with a buried or encapsulated RF active layer. The data also show the suitability of alternate polymers, all as discussed above.

EX 8

Use a conventional slot die cast film line with a 2.5 in (6.4 cm) diameter 24:1 length to diameter ratio (L/D) single screw extruder operating with ramped extruder zones of 300° F. to 350° F. (149 to 177° C.) and a 28 in (71 cm) wide slot die operating at a temperature of 350° F. (177° C.) to cast a melt-processible polymer blend composition onto a chilled (75° Fahrenheit (° F.) 25° centigrade (° C.)) casting roll to form a 10 mil (254 μm) monolayer film and thereafter wind the film into a roll. The polymer blend contains 60% of the EVACO used in Ex 6, 20% EVA (ESCORENE® LD740.16, MI of 5.5 g/10 min, 24 wt % VA, Exxon Chemical Company), 15% ethylene/alpha-olefin (EAO) plastomer (AFFINITY* PL1280, 0.900 g/cc, 6.0 g/10 min), 2% CN-4420 slip/antiblock concentrate and 3% CN-744 antiblock concentrate. All percentages are based on total blend weight.

The polymer blend exhibits a DLF, determined as in Ex 1, of 0.25 at a frequency of 27 MHz. The polymer blend composition has a nominal CO content of 5.4% CO.

Dielectrically seal two plies of the above film together using a Callanan 2 KW RF welding machine operating at 50% power setting fitted with a non-heated 0.5 in. (1.25 cm) wide by 8 in. (20.3 cm) long bar seal die and the seal times shown in Table 6. Cut the film into 1 in (2.5 cm) wide strips perpendicular to the seal. Subject the strips to Instron peel testing as in Ex 2. Table 8 shows test results in terms of both lb/in and N/mm for various seal times in seconds (sec).

TABLE 8

| Seal Time (sec) | Average Adhesion (lb/in)/(N/mm) | Maximum Adhesion (lb/in)/(N/mm) |
| --- | --- | --- |
| 0.6 | 4.1/0.72 | 4.7/0.82 |
| 1.0 | 6.1/1.07 | 6.7/1.17 |
| 1.7 | 7.0/1.22 | 9.6/1.68 |

Subject the monolayer film prepared above to physical property testing for yield tensile strength (YTS) in terms of pounds per square inch (psi)/Newtons per square millimeter (N/mm$^2$), ultimate tensile strength (UTS) in terms of psi/(N/mm$^2$), ultimate elongation (UE) in %, 2% Secant Modulus (SM) in terms of psi/(N/mm$^2$), Elmendorf Tear (ET) in terms of g/mil/(g/um) and Spencer Impact Strength (SIS) in terms of g/mil/(g/um). Conduct all testing except for SIS in both machine direction (MD) and transverse direction (TD). Table 9 sumarizes the test results.

TABLE 9

| Property | |
| --- | --- |
| Film Gauge (mils/μm) | 10/254 |
| Film density (g/cc) | 0.97 |
| MD YTS (psi/(N/mm$^2$)) | 555/3.8 |
| TD YTS (psi/(N/mm$^2$)) | 535/3.7 |
| MD UTS (psi/ N/mm$^2$) | 2020/13.9 |
| TD UTS (psi/(N/mm$^2$)) | 1420/9.8 |
| MD UE (%) | 610 |
| TD UE (%) | 575 |
| MD SM (psi/N/mm2) | 4570/31.5 |
| TD SM (psi/(N/m$^2$)) | 4520/31.1 |
| MD ET (g/mil/(g/um)) | 175/6.8 |
| TD ET (g/mil/(g/um)) | 215/8.5 |
| SIS (g/mil/(g/um)) | 485/19.1 |

The data shown in Tables 8 and 9 demonstrate that monolayer films of the present invention exhibit rapid RF weldability. The data also show that RF welding provides a strong seal. Furthermore, the film exhibits sufficient physical properties to be useful in many applications.

EX 9

Using a conventional upward blown film line with an extrusion temperature of 280° F. (138° C.), prepare a 5 mil (127 μm) monolayer film from a polymer blend composition that contains 40 wt % of the same EVACO as in Ex 6, 40 wt % of the same EVA as in the seal layer of Ex 2, 20 wt % LLDPE (DOWLEX* 2247, 0.917 g/cc density, 2.3 g/10 min MI), all percentages being based on total polymer blend weight, and 4 parts by weight per 100 parts by weight of polymer blend (phr) of the CN-4420 slip/antiblock concentrate used in Ex 8. Dielectrically seal two plies of the film together using the RF sealer of Ex 8, but with a 70% power setting and 2.5 second weld time to attain a 180° peel test adhesive strength of >3.0 lb/inch (0.52 N/mm).

EX 10

Prepare a monolayer 7.0 mil (178 μm) film using a Killion minicast film line with a 1 in (2.5 cm) diameter 24:1 L/D single screw extruder feeding a 10 in (25.4 cm) wide slot die. Ramp extruder zone temperatures from 340° F. to 360° F. (171 to 182° C.) and maintain a die temperature of 360° F. (182° C.). Extrude a blend of 60% LLDPE (same as Ex 9) and 40% EVACO (same as Ex 9) plus 5 phr CN-744 antiblock concentrate into a flat film and quench the film onto a casting roll operating at 75° F. (24° C.). The blend has a nominal CO content of 3.6%. The film exhibits a DLF of 0.10 at 27 MHz. Dielectrically seal two plies of the film together as in Ex 9 to attain a strong bond that results in cohesive failure within the film plies in response to an attempt to pull the plies apart.

EX 11

Duplicate Ex 10 save for substituting an equal weight percentage of EnBACO (same as Ex 7) for the EVACO of Ex 10 to provide a nominal blend CO content of 4.0%. An attempt to pull the plies apart leads to the same cohesive failure within film plies as in Ex 10.

EX 12

Using a conventional cast film line, extrude (at a temperature of 340° F. (171° C.)) a 10 mil (254 μm) monolayer film comprising a blend of 40 wt % EVACO (the same as in Ex 8) and 60 wt % of the EAA copolymer used in Ex 5 plus 5 phr CN-734 antiblock concentrate (15% SiO$_2$ in LDPE carrier, Southwest Chemical). The blend has a nominal CO content of 3.6 wt %.

Dielectrically seal two plies of each film sample together as in Ex 8, but with a seal time of 2.5 seconds and a 0.125 in. (0.3 cm) wide by 8 in. (20 cm) long bar seal die. Subject the film seals to peel testing as in Ex 8. The film seal exhibits an average peel strength of 3.7 lb/in (0.65 N/mm) and a maximum adhesion strength of 5.5 lb/in (0.94 N/mm)

EX 13

Using the procedure of Ex 10, prepare a 10 mil (254 μm) PP-based monolayer cast film. The film comprises 55% pp copolymer (REXFLEX® W210, Huntsman Chemical, density 0.88 g/cc, 6 g/10 minutes MFR at 230° C.), 40% EnBACO (same as Ex 4), 10% of the EVA used in the RF active core layer of Ex 2 and 5% CN-734 antiblock concentrate. The blend used to prepare the film has a nominal CO content of 4.0%. Dielectrically seal two plies of the film together as in Ex 9, but with a 3.0 second weld time to provide a seal with a 180° peel test adhesion strength of 3.0 lb/inch (0.52 N/mm).

EX 14

Using the apparatus of Ex 10 with a temperature ramp of 320° F. to 360° F. (160 to 182° C.), prepare three 7 mil (178 μm) monolayer films based upon an ethylene/styrene interpolymer (ESI) (INDEX* DE200, 70% ethylene/30% styrene, 1 g/10 min MI, The Dow Chemical Company) with or without EnBACO (same as Ex 11). Each film contains 5 phr of the same antiblock as in Ex 13. The polymer compositions, in terms of wt % ESI/wt % EnBACO, for the three films are 14A=100/0; 14B=75/25; and 14C=60/40. Table 8 summarizes DLF and adhesion test results following sealing as in Ex 13.

TABLE 8

| Ex | Average Adhesion (lb/in)/ (N/mm) | Maximum Adhesion (lb/in)/ (N/mm) | Nominal CO Content (wt %) | DLF |
|---|---|---|---|---|
| 14A* | 0/0 | 0.1/0.02 | 0 | 0.003 |
| 14B | 2.7/0.47 | 2.9/0.51 | 2.5 | 0.078 |
| 14C | 3.7/0.65 | 4.3/0.75 | 4.0 | 0.14 |

A 10 mil (254 μm) thickness of film 14C, when sealed under the same conditions as in Ex 13, yields an average adhesion of 4.0 lb/in (0.70 N/mm) and a maximum peel of adhesion of 4.9 lb/in (0.86 N/mm). The data in Table 8 demonstrate that increasing the nominal CO content above 3 wt % and increasing the DLF above about 0.1 provide a film with a significantly better adhesion seal strength than a film prepared from a polymer or polymer blend composition with a nominal CO content <3 wt %, a DLF <0.1 or both.

EX 15

Duplicate Ex 8, but increase the film thickness to 5.5 mils (140 μm). Corona treat one surface of one aliquot of the film and leave a second untreated. The untreated film has a surface energy of 34 dynes, as determined with Accu-Dyne test marker pens (available from Diversified Enterprises (Claremont, N.H.) in increments of 2 dyne units from 30 to 60 dynes). The treated film has a surface energy of 48 dynes. Skilled artisans typically use a corona treatment to increase film surface energy for better ink adhesion or to enhance adhesive bonding strength of olefinic materials.

Thermally laminate each film aliquot to automotive seating urethane foam backed fabric at a temperature of 250° F. (121° C.) using a heated TranSeal TS100 press (available from Seal Products Inc, Naugatuck, Conn.) and a 5 second dwell time. In attempting to peel the films from the foam, the untreated film separates from the foam with but takes some foam with it while the treated film exhibits enough adhesion to cause cohesive failure within the foam.

Dielectrically seal two plies of the fabric/urethane foam/corona treated monolayer film laminate at a film to film interface using the apparatus of Ex 8 with a 60% power setting and a 4 second seal time. The bonded fabric/foam/film/film/foam/fabric composite exhibits excellent adhesion. Attempts to peel the two laminate plies apart fail as evidenced by substantial cohesive foam tearing, indicating that the adhesion of the film to the urethane foam and the film-to-film dielectric (RF) weld strength exceeded the strength of the foam itself.

*AFFINITY, DOWLEX AND INDEX are Trademarks of The Dow Chemical Company.

What is claimed is:

1. A halogen-free, high frequency sealable multilayer film comprising at least:
   (a) a polar layer having a dielectric loss factor of at least 0.10 comprising a blend of polar and non-polar polymers wherein the polar polymer is an ethylene copolymer with carbon monoxide (CO) selected from a group of consisting of ethylene-vinyl acetate-carbon monoxide and ethylene-n-butyl acrylate-carbon monoxide terpolymers; wherein the CO comprises at least 3 percent by weight of the polar layer;
   (b) a layer comprising a non-polar olefin homopolymer or non-polar olefin copolymer, and
   (c) a surface bonding or adhesive layer;
   wherein, (a) is between (b) and (c) and accounts for at least 20% of the film gauge when said multilayer film has a thickness less than 10 mils (250 micrometers); wherein said multilayer film has an interlayer adhesion strength of at least four pounds per inch (0.7 Newton per millimeter); and wherein two plies of the multilayer film have a seal strength of at least one pound per inch (0.18 Newton per millimeter) when sealed in a bonding layer-to-bonding layer orientation using a 1.5 kilowatt Callanan radio frequency sealer operating at 27.1 megahertz and 0.5 second seal time.

2. The halogen-free, high frequency sealable film of claim 1 wherein (a) comprises a blend of at least two olefin polymers wherein one olefin polymer is a non-polar olefin homopolymer or a non-polar olefin copolymer and at least one olefin polymer has polymerized therein at least ethylene and carbon monoxide, the carbon monoxide being present in an amount sufficient to give the blend a dielectric loss factor of at least 0.10.

3. The film of claim 2, wherein the amount of carbon monoxide is at least 3 percent by weight, based on total blend weight.

4. The film of claim 1 or claim 2, wherein the carbon monoxide containing polymer is selected from an ethylene-carbon monoxide copolymer, an ethylene-vinyl acetate-carbon monoxide terpolymer, an ethylene-acrylic acid-carbon monoxide terpolymer or an ethylene-butyl acrylate-carbon monoxide terpolymer.

5. The film of claim 1 or claim 2, wherein the non-polar homopolymer or copolymer is at least one of low density polyethylene, linear low density polyethylene, ultra-low density polyethylene, high density polyethylene, polypropylene homopolymer, propylene copolymer, metallocene catalyzed polyethylene plastomer, ethylene/styrene interpolymer, ethylene/acrylic acid, ethylene/vinyl acetate, ethylene/methyl acrylate, and a maleic anhydride-modified olefin polymer.

6. The film of claim 1, wherein the carbon monoxide monomer comprises from about 6 to about 40 percent by weight of the ethylene copolymer with carbon monoxide.

7. The film of claim 1 in which the ethylene copolymer with CO comprises from about 30 to about 80 weight percent of the polar layer.

8. The film of claim 2, wherein the olefin polymer having polymerized therein at least ethylene and carbon monoxide comprises from about 30 to about 80 weight percent of the blend.

9. The film of claim 1, wherein at least one layer further comprises a compatibilizing polymer.

10. The film of claim 2, wherein the blend further comprises a compatibilizing polymer.

11. An article of manufacture fabricated from the film of claim 1 or claim 2, the film being sealed to itself, to another substrate or to both at a seal interface.

12. The article of claim 11, wherein the seal interface has a bond strength of at least 1.0 pound per inch (0.18 Newton per millimeter).

13. A halogen-free, high frequency sealable tubing comprising the film of claim 1 or claim 2.

14. The article of claim 11, wherein the olefin polymer blend has a carbon monoxide content sufficient to render the film susceptible to sealing via exposure to high frequency energy.

* * * * *